(12) United States Patent
Gomes et al.

(10) Patent No.: US 12,446,859 B2
(45) Date of Patent: Oct. 21, 2025

(54) AUTOMATED MATERNAL AND PRENATAL HEALTH DIAGNOSTICS FROM ULTRASOUND BLIND SWEEP VIDEO SEQUENCES

(71) Applicant: Google LLC, Mountain View, CA (US)

(72) Inventors: Ryan Gomes, Mountain View, CA (US); Shravya Shetty, Mountain View, CA (US); Daniel Tse, Mountain View, CA (US); Chace Lee, Mountain View, CA (US); Alex Starns, Mountain View, CA (US)

(73) Assignee: Google LLC, Mountain View, CA (US)

( * ) Notice: Subject to any disclaimer, the term of this patent is extended or adjusted under 35 U.S.C. 154(b) by 604 days.

(21) Appl. No.: 17/763,120

(22) PCT Filed: Jul. 8, 2020

(86) PCT No.: PCT/US2020/041126
§ 371 (c)(1),
(2) Date: Mar. 23, 2022

(87) PCT Pub. No.: WO2021/061257
PCT Pub. Date: Apr. 1, 2021

(65) Prior Publication Data
US 2022/0354466 A1 Nov. 10, 2022

Related U.S. Application Data

(60) Provisional application No. 62/906,827, filed on Sep. 27, 2019, provisional application No. 62/906,824, filed on Sep. 27, 2019.

(51) Int. Cl.
*A61B 8/00* (2006.01)
*A61B 8/08* (2006.01)
*G06T 7/00* (2017.01)

(52) U.S. Cl.
CPC .......... *A61B 8/5223* (2013.01); *A61B 8/0866* (2013.01); *A61B 8/461* (2013.01);
(Continued)

(58) Field of Classification Search
CPC ..... A61B 8/5223; A61B 8/0866; A61B 8/461; A61B 8/5246; A61B 8/469; G06T 7/0012;
(Continued)

(56) References Cited

U.S. PATENT DOCUMENTS 8,914,245 B2    12/2014  Hopkins
2018/0271484 A1*  9/2018  Whisler ............... A61B 8/0825
(Continued)

OTHER PUBLICATIONS

Patra et al., "Multi-anatomy localization in fetal echocardiography videos", 2019 IEEE 16th International Symposium on Biomedical imaging (ISBI 2019) IEEE, Apr. 8, 2019, pp. 1761-1764.
(Continued)

*Primary Examiner* — Jamares Q Washington
(74) *Attorney, Agent, or Firm* — McDonnell Boehnen Hulbert & Berghoff LLP (57) ABSTRACT

A system is described for generating diagnostic information from a video sequence of ultrasound images acquired in "blind sweeps", i.e., without operator seeing ultrasound images as they are acquired. We disclose two different types of machine learning systems for predicting diagnostic information: a "Temporal Accumulation" system and a "3-D Modeling Component" system. These machine learning systems could be implemented in several possible ways: using just one or the other of them in any given implementation, or using both of them in combination. We also disclose a computing system which implements (a) an image selection system including at least one machine learning model trained to identify clinically suitable images from the sequence of ultrasound images and (b) an image diagnosis/ measurement system including of one or more machine learning models, configured to obtain the clinically suitable images identified by the image selection system and further process such images to predict health states.

20 Claims, 6 Drawing Sheets

(52) U.S. Cl.
CPC .......... *A61B 8/5246* (2013.01); *G06T 7/0012* (2013.01); *A61B 8/469* (2013.01); *G06T 2207/10016* (2013.01); *G06T 2207/10132* (2013.01); *G06T 2207/20081* (2013.01); *G06T 2207/20084* (2013.01); *G06T 2207/30044* (2013.01)

(58) Field of Classification Search
CPC . G06T 2207/10132; G06T 2207/20081; G06T 2207/30044
USPC ......... 382/128, 160; 600/511, 453, 313, 300
See application file for complete search history.

(56) References Cited

U.S. PATENT DOCUMENTS

| | | | |
|---|---|---|---|
| 2019/0223725 A1* | 7/2019 | Lu ........................... | G06N 3/044 |
| 2020/0058126 A1* | 2/2020 | Wang ...................... | G06N 3/045 |
| 2020/0125852 A1* | 4/2020 | Carreira ................. | G06N 3/049 |
| 2020/0367860 A1* | 11/2020 | Rouet .................... | A61B 8/483 |
| 2021/0161508 A1* | 6/2021 | Schadewaldt ........ | A61B 8/0883 |
| 2022/0198669 A1* | 6/2022 | Chen ..................... | G06T 7/0016 |

OTHER PUBLICATIONS

Liu et al., "Deep Learning in Medical Ultrasound analysis: A Review", Engineering, vol. 5, No. 2, Jan. 29, 2019, pp. 261-275.
Anonymous: "Prenatal testing—Wikipedia", Sep. 25, 2019, 17 pages.
International Search Report dated Sep. 30, 2020 for International Application No. PCT/US2020/041126, 5 pages.

\* cited by examiner

AUTOMATED MATERNAL AND PRENATAL HEALTH DIAGNOSTICS FROM ULTRASOUND BLIND SWEEP VIDEO SEQUENCES

PRIORITY

This application is a US national phase application of International Patent Application No. PCT/US2020/041126 filed on Jul. 8, 2020, which claims priority benefits of U.S. provisional application Ser. No. 62/906,824 filed Sep. 27, 2019 and U.S. provisional Ser. No. 62/906,827, also filed on Sep. 27, 2019, which are hereby incorporated by reference in their entirety.

BACKGROUND

Existing use of clinical ultrasound in maternal health care involves a trained technician/operator that manually acquires ideal images by guiding a hand-held probe in response to the images presented on a screen. The operator uses their detailed understanding of fetal and maternal anatomy to acquire images with clinical value. The acquired images are in many cases read or interpreted by an obstetrician or radiologist in a second reading step. The high level of training required to use clinical ultrasound limits the adoption of the technology, especially in developing countries.

Maternal health in most developed countries is assessed at least once in each trimester of pregnancy. Based on current understanding of normal progression of fetal development and maternal health there are characteristic normal ranges of anatomic progression and pathologies to be screened for with ultrasound during each of these time points. However, in resource constrained areas, many women may only receive one or often no (50% of cases) ultrasound screenings during their pregnancy in spite of WHO recommendations for at least one before. As there are a number of maternal fetal health conditions that can be managed or prevented, a major barrier is making ultrasound screenings more accessible in the last-mile of healthcare delivery in low and middle income country settings.

With the cost of ultrasound hardware decreasing, the most significant remaining barrier to increased adoption is the level of skill required to successfully acquire and interpret clinically usable ultrasound images. To become proficient in both requires seeing a high number of cases in training and clinical practice. Even when split up between technicians (usually trained for acquisition) and providers (usually trained for both acquisition and interpretation), there are shortages in available expertise leading to workflow blockers and sub-optimal care.

This disclosure relates to a system and method for generating diagnostic information from a video sequence of maternal and prenatal ultrasound images. The system and methods allows such information to be obtained even though the images could be acquired by an operator, such as a non-expert, in "blind sweeps." The term "blind sweeps" means that, during acquisition, the ultrasound operator does not modify probe motion in response to acquired images, that is, they perform it "blind" and either do not have access to acquired images in real time, or if they are available they are not used. The probe sweep motion is only required to cover the general area of clinical interest. Ultrasound acquisition using "blind sweeps" is a technique that can be learned in much less time than existing ultrasound acquisition methods used by experts. Hence, the system and methods of this disclosure have particular potential for use in developing countries where there is a shortage of expert ultrasound technicians.

SUMMARY

In one aspect, a system is described for generating diagnostic information (e.g., a clinical value relating to the maternal health of a female or a fetus carried by the female) from a video sequence of ultrasound images. The system makes use of temporal relationship between images in the sequence. In particular, we disclose two different types of machine learning systems for predicting diagnostic information by processing video sequences; such video may be acquired by blind sweeps but this is not essential. These two different machine learning systems could be implemented in several possible ways: using just one or the other of them, or using them in combination.

The first type of machine learning system (referred to below as "Temporal Accumulation") receives images from the video sequence in sequential fashion. It includes a first stage component in the form of a two-dimensional (2-D) image convolutional neural network which generates a 2-D feature representation or 2-D segmentation mask of an area of interest (e.g., fetus) for an individual image in the video sequence. These 2-D representations are then passed to a temporal accumulation component which aggregates 2-D spatial information of the area of interest from each image in the sequence of video images over time and generates a video-level prediction relative to the area of interest containing the diagnostic information. The temporal accumulation component ("accumulator") may itself be a trained recurrent neural network model such as a convolutional-LSTM (Long Short Term Memory) neural network or convolutional-RNN (Recurrent Neural Network) which contains both convolution and temporal memory neural units. Alternatively, the accumulator may consist of fixed aggregation rules such as summation of segmentation mask input values to estimate the size of a segmented region of interest as captured from different probe positions over time.

The second type of machine learning system (referred to as "3-D Modeling Component") receives blind sweep video sequences as a three-dimensional tensor, in which successive 2-D images are stacked in a third (time) dimension. The first stage of this system consists of a modeling component in the form of a 3-D convolutional neural network which outputs a 3-D feature representation or segmentation mask for the complete video sequence. This representation forms the input for a final prediction unit, which are one or more neural network layers that compute the video level prediction for the video sequence from the 3-D feature representation of segmentation mask containing the diagnostic information.

As noted above, an implementation of this disclosure may include just one of these types of machine learning systems. In an alternative embodiment, both may be implemented. For example, the system could predict more than one clinical value of interest (such as gestational age prediction and detection of fetal abnormalities), each with its own preferred approach consisting of implementing one type of machine learning system for one clinical value of interest, and the other type of machine learning system for prediction of another clinical value of interest. Alternatively, the two different machine learning systems could be used together on the same input video sequence to predict the same clinical value of interest, and the predictions of each different machine learning system could be "ensembled" (e.g., averaged) together to improve the performance of the overall system.

In another aspect, a method for generating diagnostic information from maternal and prenatal ultrasound images is disclosed. The method includes steps of obtaining a video sequence of ultrasound images from a human subject (which may be acquired by an operator performing blind sweeps on the subject, although this is not absolutely necessary); and supplying the video sequence to a computer system. The computer system implements at least one of:

a) a temporal accumulation machine learning system including (1) a two-dimensional image convolutional neural network which generates a 2-D feature representation of an area of interest for an individual image in the video sequence, and (2) a temporal accumulation component aggregating information as to the area of interest from each image in the sequence of video images over time and generating a video-level prediction relative to the area of interest containing the diagnostic information;

and/or b) a 3-D modeling (two spatial dimensions plus a time dimension) machine learning system receiving the video sequence as a 3-D tensor in which successive 2-D images are stacked in a third (time) dimension, the 3-D modeling machine learning system including (1) a modelling component including a 3-D convolutional neural network which outputs a 3-D feature representation or segmentation mask for the complete video sequence, and (2) a final prediction unit comprising one or more neural network layers that compute a video-level prediction for the video sequence from the 3-D feature representation or segmentation containing the diagnostic information.

In still another aspect, a method of determining one or more maternal health parameters of a female is disclosed which includes performing the method as recited in the previous paragraph on an ultrasound image sequence acquired from the female and wherein the video-level prediction generated by the machine learning system a) and/or b) comprises a prediction of the one or more maternal health parameters, and wherein the maternal health parameters are selected from the group consisting of classification of fetal anomalies or birth defects of a fetus carried by the female, counting the number of fetuses carried by the female, detection of fetal viability/heartbeat of a fetus carried by the female, localization of a placenta, and detection of placental abnormalities.

The system and methods of this disclosure optionally may include a feedback generation aspect to provide feedback to the operator of the ultrasound probe. The feedback could be displayed to the operator in a variety of formats, for example on the display of a tablet or smart phone, on a local desktop computer, or on a display of an ultrasound machine. The feedback system instructs the operator to perform a different sweep motion in the event that no suitable images were selected in prior sweeps. In this embodiment, a machine learning model implements one or the other of the two ML systems outlined above but is trained to predict the best sweep from a predefined set of blind sweep motions (e.g., lateral motion intersecting the patient's navel, cranio-caudal motion intersecting the patient's midline, etc.). The top predicted sweep motion from the set is then suggested to the operator, e.g., via a display, via a spoken prompt, or via a textual prompt or message.

In another aspect, we disclose in this document a system for generating diagnostic information from maternal and prenatal ultrasound images in the form of a computing system receiving a sequence of ultrasound images from a human subject. The computing system implements an image selection system and an image diagnosis/measurement system.

The image selection system includes one or more machine learning models, e.g., deep convolutional neural networks, which identifies clinically suitable images from a sequence of ultrasound images. Because the images may be acquired in a blind sweep operation (and potentially by an operator with limited training) there is a significant likelihood that some, or many, acquired ultrasound images are of limited or no clinical utility. This model classifies or scores ultrasound images according to their suitability for one or more clinical diagnostic purposes. Images are selected for further analysis if they receive a high score or positive classification by this model. In one embodiment, this image selection model is trained using images labeled by an expert according to their usefulness for clinical diagnosis or measurement (e.g., measurement of parameters enabling gestation age to be determined such as head circumference or femur length). In another embodiment the image selection model is trained to predict the expected accuracy of the image diagnosis/measurement system. In this configuration the image selection model selects images that enable accurate measurement or diagnosis and ignores irrelevant images.

The image diagnosis/measurement system, which could consists of one or more machine learning models, e.g., deep convolutional neural networks, obtains the selected images from the image selection model and further processes these images. The image diagnosis/measurement model could include one or more diagnosis classification models for predicting health states (maternal or fetal), segmentation models for identifying and measuring anatomical regions of interest, e.g., abdominal and cranial circumference, femur length, etc., object detection models for localizing anatomical structures of interest, and image regression models for measuring clinically relevant numerical quantities, e.g., gestation age. The models could be trained using labels provided by human experts, or with labels derived from patient history reports, e.g., in an electronic health record.

We disclose the use of segmentation models to measure anatomical regions of interest, and image regression models measuring clinical relevant numerical quantities. Segmentation models label every image pixel according to whether it is part of the anatomical region of interest. Measurements such as head circumference can then be derived by measuring the perimeter of this image region, and converting this to an equivalent physical measurement (ultrasound devices provide scale information that relates size in pixels to physical size in centimeters.) Regression models predict a numerical quantity directly from the image, without identifying the exact location or extent of an anatomical region of interest. This would be most appropriate for predicting gestational age from the image, but could also be used to directly predict a physical measurement like head circumference (i.e., the regression model can estimate the size of the head, but does not tell us exactly where the head is within the image.)

The system further could include a feedback generation system to provide feedback to the operator of the ultrasound probe. The feedback could be displayed to the operator in a variety of formats, for example on the display of a tablet or smart phone, on a local desktop computer, or on a display of an ultrasound machine. This system instructs the operator to perform a different sweep motion in the event that no suitable images were selected in prior sweeps. In this embodiment, a machine learning model analyzes previously selected images to predict the best sweep from a predefined set of blind sweep motions (e.g., lateral motion intersecting the patient's navel, cranio-caudal motion intersecting the patient's midline, etc.). The top predicted sweep motion from the set is then suggested to the operator, e.g., via a display, via a spoken prompt, or via a textual prompt or message. The feedback suggestion model is trained to predict the end-to-end performance of the image selection and diagnosis/measurement models for each of the blind sweep motion types, given the set of images acquired from previously performed sweeps.

In another aspect, a method for generating diagnostic information from maternal and prenatal ultrasound images is described. The method includes the steps of obtaining a sequence of ultrasound images from a human subject; identifying clinically suitable images from the sequence of ultrasound images with the aid of at least one machine learning model trained to identify clinically suitable images; and further processing the identified clinically suitable images by an image diagnosis/measurement system. The image diagnosis/measurement system includes at least one of 1) one or more diagnosis classification machine learning models for predicting health states, 2) one or more segmentation machine learning models for identifying and measuring anatomical regions of interest, 3) one or more object detection machine learning models for localizing structures of interest, or 4) one or more image regression machine learning models for measuring clinically relevant numerical quantities.

In another aspect, a method is described for determining one or more maternal health parameters of a female. The method includes performing the method as described in the previous paragraph on a sequence of ultrasound images obtained from the female, wherein the image diagnosis/measurement system produces a prediction of one or more maternal health parameters, and wherein the maternal health parameters are selected from the group consisting of (1) gestation age of a fetus carried by the female, (2) classification of fetal anomalies or birth defects of a fetus carried by the female, (3) counting the number of fetuses carried by the female, (4) detection of fetal viability/heartbeat of a fetus carried by the female, (5) localization of a placenta, and (6) detection of placental abnormalities.

BRIEF DESCRIPTION OF THE DRAWINGS

FIG. 2 is an illustration of a system in which both types are present.

DETAILED DESCRIPTION

Figure 1:
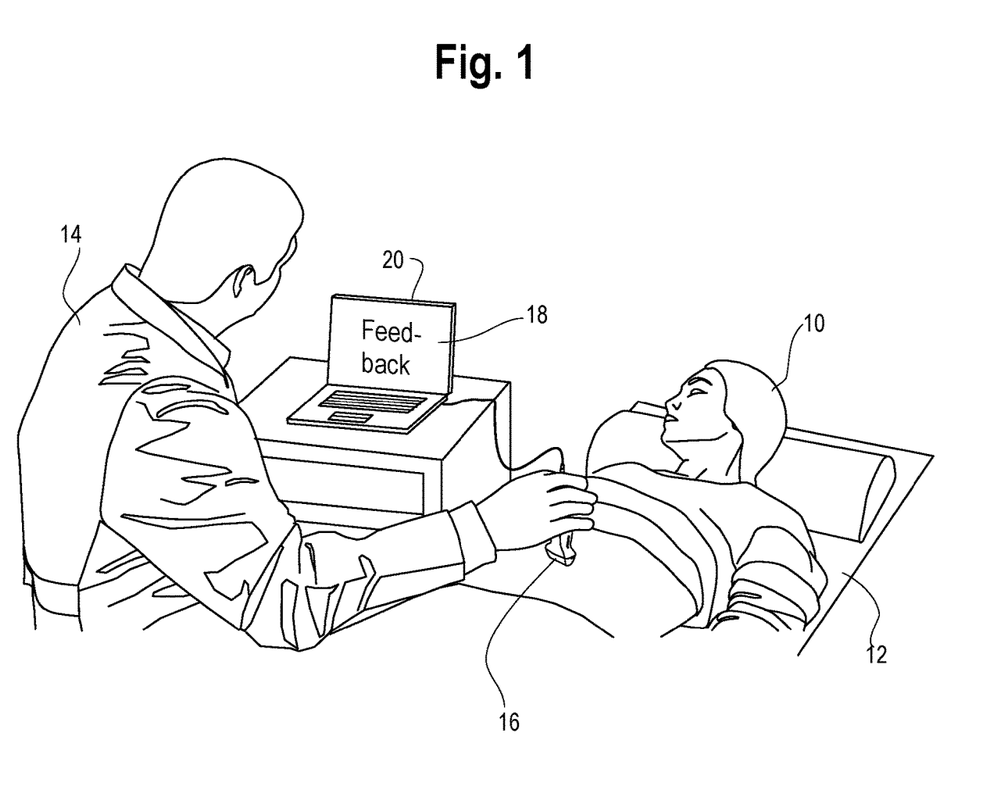
FIG. 1 is an illustration of the system of this disclosure in use.
Figure 2:
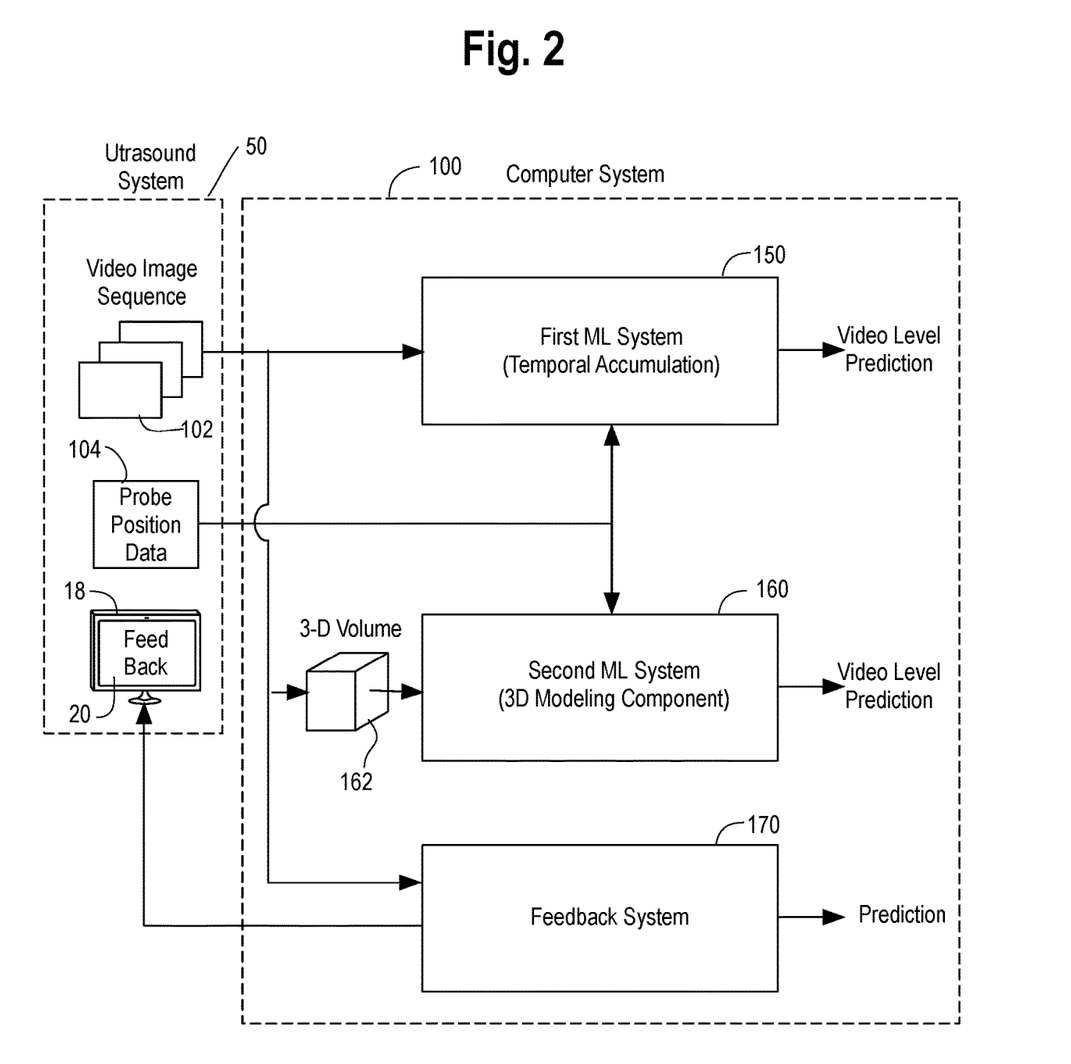
FIG. 2 is a block diagram of a computer system implementing two different types of machine learning systems for generating predictions from an input ultrasound video sequence; it will be understood that only one type of machine learning (ML) system may be present, or alternatively both types may be present.

In one aspect, a system and method for generating diagnostic information from maternal and prenatal ultrasound video sequences is disclosed in FIGS. 1 and 2. FIG. 1 shows one example the system (100, FIG. 2) of this disclosure in use. A patient (e.g., pregnant female) 10 is positioned on a table 12 and a technologist 14 uses an ultrasound probe 16 to generate a video sequence. The ultrasound probe 16 is connected to a local computer 18 (which is a laptop in this example) which includes a display 20 for display of feedback to the operator as explained in more detail later. In one configuration, the probe 16 is conventional and a conventional ultrasound cart and associated processing units and monitors (not shown) could be present.

In one possible configuration, the probe 16 takes the form of the ultrasound probe described in U.S. provisional patent application Ser. No. 62/800,825 filed Feb. 4, 2019, entitled "Instrumented Ultrasound Probes for Machine-learning generated real-time sonographer feedback", assigned to the present assignee. The probe described in provisional patent application Ser. No. 62/800,825 includes position and orientation sensors, as well as a feedback display for displaying feedback in the form of movement suggestions directly on the probe. The entire content of the provisional patent application Ser. No. 62/800,825 is incorporated by reference herein.

Referring now to FIG. 2, an ultrasound system 50 consisting of the probe 16 of FIG. 1 and associated (conventional) processing unit(s) generates a video image sequence 102. Additionally, and optionally probe position data 104 generated by position sensors incorporated into the probe 16 as described in the above-reference patent application are supplied to a computer system 100. The system 100 could be implemented locally, e.g., in a desk-top or laptop computer (see 18 in FIG. 1), on a networked server, or in a remote server or computer system connected via the Internet to the computer 18 of FIG. 1.

As mentioned in the Summary, we describe two different types of machine learning systems (150 and 160 in FIG. 2) for predicting diagnostic information by processing video sequences 102 generated from an ultrasound probe; such video sequences may be acquired by the operator 14 of FIG. 1 performing blind sweeps. These two different machine learning systems could be implemented in several possible ways: using just one or the other of them 150/160, or using them (150/160) in combination. FIG. 2 shows an implementation in which both types of systems 150 and 160 are present.

The first type of machine learning system 150 (referred to below as "Temporal Accumulation") receives images from the video sequence 120 in sequential fashion. This system is shown in greater detail in FIG. 3. This system 150 includes a first stage component 152 in the form of a two-dimensional (2-D) image convolutional neural network which generates a 2-D feature representation (feature maps) or alternatively a 2-D segmentation mask 156 for an area of interest in an individual image. These 2-D representations or masks 156 are then passed to a temporal accumulation component 158 which aggregates 2-D spatial information of the area of interest (e.g., fetus or portion thereof) over time and generates a video-level prediction containing the diagnostic information. The temporal accumulation component 158 ("accumulator") may itself be a trained recurrent neural network model such as a convolutional-LSTM (Long Short Term Memory) neural network or convolutional-RNN (Recurrent Neural Network) which contains both convolution and temporal memory neural units. Alternatively, the accumulator 158 may consist of fixed aggregation rules such as summation of segmentation mask input values to estimate the size of a segmented region of interest as captured from different probe positions over time.

Figure 3:
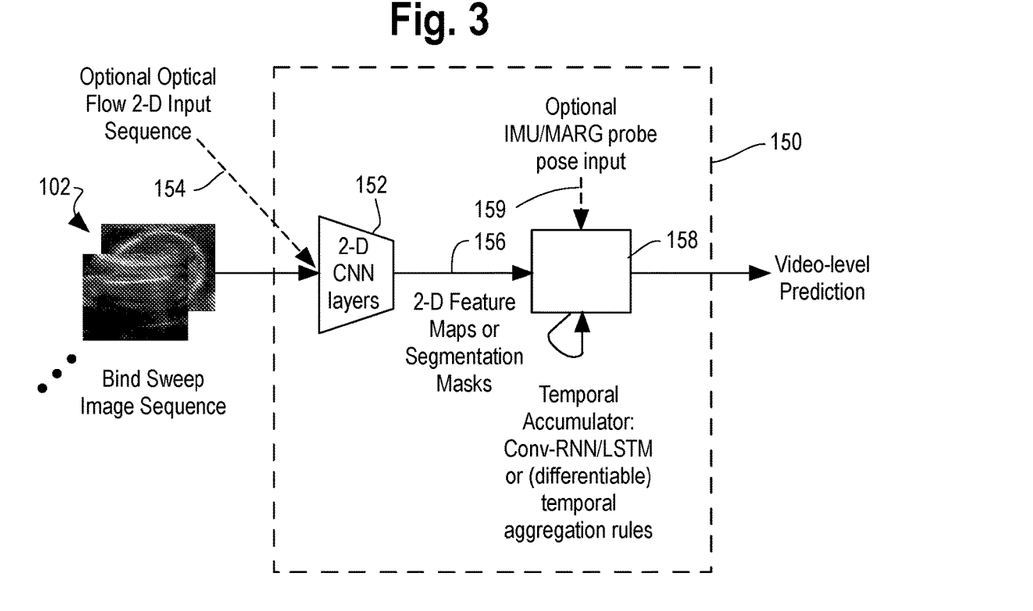
FIG. 3 is a more detailed illustration of the first (Temporal Accumulation) ML system of FIG. 2.

Optionally, the temporal accumulator system 150 may include 2-D optical flow images as an additional input 154. 2-D optical flow inputs estimate the motion between successive image frames.

Optionally, the accumulator 158 receives ultrasound probe position input 159 from an inertial measurement unit (IMU) or MARG (Magnetic, Angular Rate, and Gravity) sensors which are incorporated in the ultrasound probe. These sensors provide the geometric relationship of successive image frames, and may be used to improve measurements of anatomical regions of interest.

Referring again to FIG. 2, the second type of machine learning system 160 (referred to as "3-D Modeling Component") receives blind sweep video sequences as a three-dimensional tensor, in which successive 2-D images are stacked in a third (time) dimension, shown in FIG. 2 as 3-D volume 162. (While we use the term "volume" here and in FIG. 2 it will be understood that the third dimension is time, not space). The 3-D Modeling Component system 160 is shown in greater detail in FIG. 4.

Figure 4:
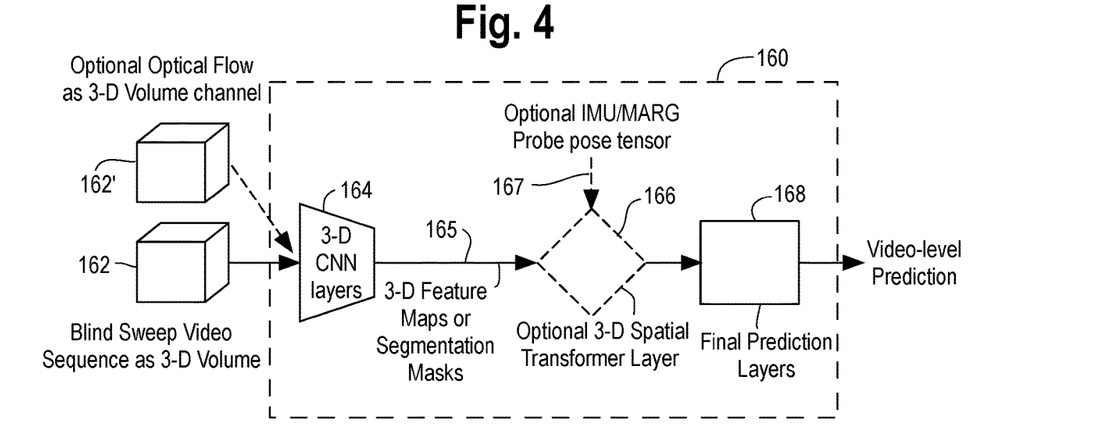
FIG. 4 is a more detailed illustration of the second (3-D Modeling Component) ML system of FIG. 2.

Referring to FIG. 4, the first stage of this system 160 consists of a 3-D convolutional neural network 164 which outputs as a 3-D feature representation (feature maps) or segmentation mask(s) 165 for the complete video sequence. This representation forms the input for a prediction unit 168, which are neural network layers that compute the video level prediction for the video sequence.

Optionally, the 3-D modeling component 160 may include a 3-D spatial transformer layer 166 between the output of the layers of the 3-D convolutional neural network 164 and the final prediction unit 168. This layer 166 receives a tensor 167 of probe pose (position and/or orientation) estimates generated by an inertial measurement sensor, MARG sensor or other probe position sensor incorporated in the ultrasound probe. The spatial transformer layer generates an accurate 3-D (three spatial dimension) representation of maternal and fetal anatomy by taking into account the geometric relationships between blind sweep image frames in the input volume.

Optionally, the initial 3-D convolutional layers 164 may also receive 3-D channels 162' consisting of stacked 2-D optical flow estimates. Optionally, the system may also include an additional classification model (not shown) for identifying a sub-sequence of appropriate frames (e.g., those where a specific anatomical structure is visible) to use as input to the 3-D modelling component 160 outlined above.

As noted above, an implementation of this disclosure may include just one of these types 150/160 of machine learning systems. In an alternative embodiment, both machine learning systems 150 and 160 may be implemented. For example, the system 100 could predict more than one clinical value of interest (such as gestational age prediction and detection of fetal abnormalities), each with its own preferred approach consisting implementing one type of machine learning system for one clinical value of interest (e.g., via the use of machine learning system 150), and the other type of machine learning system 160 for prediction of another clinical value of interest. Alternatively, the two different machine learning systems 150 and 160 could be used together on the same input video sequence 102 to predict the same clinical value of interest, and the predictions of each different machine learning system 150 and 160 could be "ensembled" (e.g., averaged) together to improve the performance of the overall system.

The system 100 of FIG. 2 further could include an optional feedback generation system 170 to provide feedback to the operator of the ultrasound probe. The feedback could be displayed to the operator 14 in a variety of formats, for example on the display of a tablet or smart phone, on a local desktop or laptop computer (as shown in FIG. 1), or on a display of an ultrasound machine. This system instructs the operator to perform a different sweep motion in the event that no suitable images were selected in prior sweeps, see for example FIG. 5 and the prompt or instruction 22. In this embodiment, a machine learning model in the feedback system 170 (e.g., using the architecture of the ML systems 150 and 160 of FIG. 3 or FIG. 4) uses the same video modeling techniques outlined above but is trained to predict the best sweep from a predefined set of blind sweep motions (e.g., lateral motion intersecting the patient's navel, craniocaudal motion intersecting the patient's midline, etc.). The top predicted sweep motion from the set is then suggested to the operator, e.g., via a display, via a spoken prompt, or via a textual prompt or message. The machine learning model is trained to predict the end-to-end performance of a prediction unit of the machine learning systems 150 and/or 160 for each of the blind sweep motion types, given the sequence 102 of images acquired from previously performed sweeps.

Deep convolutional neural networks which are trained on image data sets to make predictions or classify images are widely known and described in the patent and technical literature, therefore a detailed discussion of the networks 162 and 162 (FIGS. 3 and 4) is omitted for the sake of brevity. One example of deep convolutional neural network architecture is the Inception architecture described in the scientific literature. See the following references, the content of which is incorporated by reference herein: C. Szegedy et al., Going Deeper with Convolutions, arXiv:1409.4842 [cs.CV] (September 2014); C. Szegedy et al., Rethinking the Inception Architecture for Computer Vision, arXiv: 1512.00567 [cs.CV] (December 2015); see also U.S. patent application of C. Szegedy et al., "Processing Images Using Deep Neural Networks", Ser. No. 14/839,452 filed Aug. 28, 2015.

Exemplary Clinical Use Cases

This section outlines several examples clinical applications that are possible with the system and methods of this disclosure.

1. Gestational Age Prediction

Gestational age of the fetus is a primary clinical indicator in maternal healthcare. In current practice, gestational age is estimated from one or more standard fetal anatomical measurements. The system of FIGS. 1-2 may be configured to predict cross-sectional or volumetric measurements of fetal anatomy, where model training labels are obtained from patient history reports or based on expert labeling of the extent of anatomical regions of interest in a set of training images. Standard fetal measurements from multiple instantiations of this disclosure may be combined using existing formulas for gestational age, or with regression models trained from patient history records. Alternatively, the ML systems 150 and/or 160 may be trained to predict gestational age directly, by training the system(s) with gestational age estimates in patient history records.

2. Maternal Health Applications

The system of this disclosure can support a number of additional maternal health applications which include the following: classification of fetal anomalies or birth defects, counting the number of fetuses, detection of fetal viability/heartbeat, localization of the placenta, and detection of placental abnormalities. In these clinical applications, the machine learning models 150/160 are trained to make classifications or predictions from selected images in the video sequence such as whether or not a particular fetal anomaly or birth defect is present in a sequence of ultrasound images 102, the detection of fetal heartbeat, detection of particular placental abnormality, etc. Such models will be trained generally in the manner described in this document, and can take the form of the deep convolutional neural networks described previously.

Neural network layers in the machine learning systems 150/160 may optionally receive additional non-ultrasound clinical covariate data to improve performance. For example, additional patient information such as height, weight, and age may be used to improve gestational age prediction in combination with the blind sweep video sequence.

Accordingly, in one further aspect of this disclosure we have described a method for generating diagnostic information from maternal and prenatal ultrasound images. Referring to FIGS. 1-4, the method includes steps of obtaining a video sequence (102, FIG. 2) of ultrasound images from a human subject (which may be acquired by an operator performing blind sweeps on the subject, although this is not absolutely necessary); and supplying the video sequence to a computer system 100 (FIG. 2). The computer system 100 implements at least one of:

a) a temporal accumulation machine learning system (150) including (1) a two-dimensional image convolutional neural network 152 which generates a 2-D feature representation of an area of interest for an individual image in the video sequence, and (2) a temporal accumulation component 156 aggregating information as to the area of interest from each image in the sequence of video images 102 over time and generating a video-level prediction relative to the area of interest containing the diagnostic information; and/or b) a 3-D modeling (two spatial dimensions plus a time dimension) machine learning system 160 receiving the video sequence 102 as a 3-D tensor 162 in which successive 2-D images are stacked in a third (time) dimension, the 3-D modeling machine learning system 162 including (1) a modelling component including a 3-D convolutional neural network 164 which outputs a 3-D feature representation or segmentation mask 154 for the complete video sequence 102, and (2) a final prediction unit 168 comprising one or more neural network layers that compute a video-level prediction for the video sequence from the 3-D feature representation or segmentation mask 165 containing the diagnostic information.

In one possible embodiment of the method, the video sequence 102 is obtained by a blind sweep. In one possible embodiment the method includes a further step of providing feedback to the operator of an ultrasound probe used to obtain the video sequence.

In another aspect, a method of determining the gestational age of a fetus has been described, which includes the steps of performing the method as described above on a video sequence of ultrasound images obtained from a pregnant human and wherein the video-level prediction generated by the machine learning system a) or b) comprises a prediction of the gestational age of a fetus carried by the pregnant human.

In still another aspect, a method of determining one or more maternal health parameters of a female is disclosed which includes performing the method as recited previously on an ultrasound image sequence acquired from the female and wherein the video-level prediction generated by the machine learning system a) and/or b) comprises a prediction of the one or more maternal health parameters, and wherein the maternal health parameters are selected from the group consisting of classification of fetal anomalies or birth defects of a fetus carried by the female, counting the number of fetuses carried by the female, detection of fetal viability/heartbeat of a fetus carried by the female, localization of a placenta, and detection of placental abnormalities.

Figure 6:
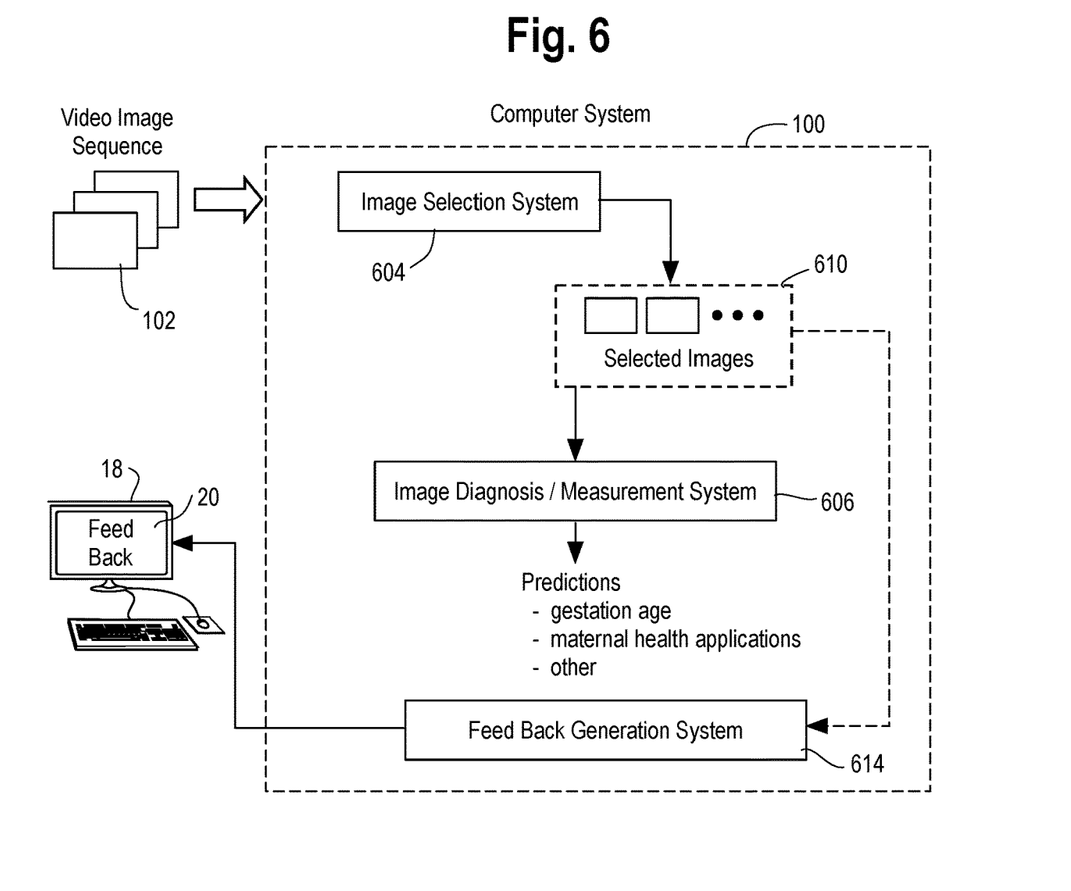
FIG. 6 is a block diagram of a computer system implementing and image selection system and an image diagnosis/measurement system with an optional feedback generation system providing feedback to the operator as shown in FIG. 1.

In another aspect, and referring now to FIG. 6, our system for generating diagnostic information from maternal and prenatal ultrasound images includes a computing system 600 receiving a sequence of ultrasound images 602 from a human subject. The computing system 600 implements an image selection system 604 and an image diagnosis/measurement system 606.

The image selection system 604 includes one or more machine learning models 620 (FIG. 7), e.g., deep convolutional neural networks (CNN), which identifies and selects clinically suitable images from a sequence of ultrasound images. The selected images are shown at 610. Because the images in the sequence 102 may be acquired in a blind sweep operation (and potentially by an operator with limited training) there is a significant likelihood that some, or many, acquired ultrasound images 602 are of limited or no clinical utility. The one or more machine learning models 620 (e.g., CNN neural network) in the image selection system 604 includes an output layer 622 which classifies or scores ultrasound images according to their suitability for one or more clinical diagnostic purposes. Images are selected for further analysis if they receive a high score or positive classification by this model(s). In one embodiment, this image selection model(s) 620 is trained using images labeled by an expert according to their usefulness for clinical diagnosis or measurement (e.g., measurement of parameters enabling gestation age to be determined such as head circumference or femur length). In another embodiment the image selection model is trained to predict the expected accuracy of the image diagnosis/measurement system. In this configuration the image selection model selects images that enable accurate measurement or diagnosis and ignores irrelevant images. Because of the different types of predictions that the image selection system may be performing, we contemplate that the image selection system may incorporate different machine learning models. For example, one model may be used to classify images for usefulness for clinical diagnosis or measurement, one model may be used to predict expected accuracy of the image diagnosis/measurement system 606, etc.

Figure 7:
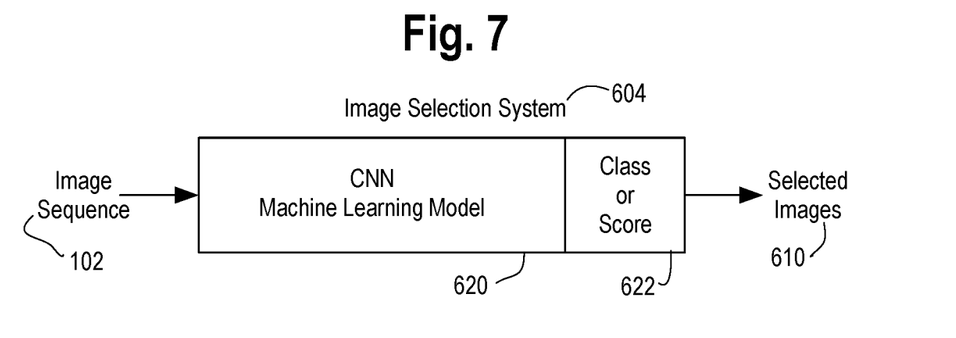
FIG. 7 is a more detailed illustration of the image selection system of FIG. 6.
Figure 8:
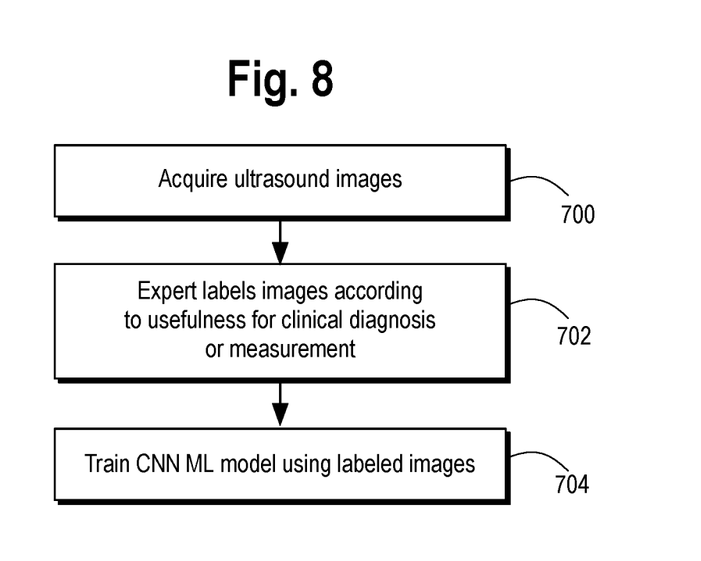
FIG. 8 is a flow chart showing a training process for training the image diagnosis/measurement system of FIG. 6.

Deep convolutional neural networks which are trained on image data sets to make predictions or classify images are widely known and described in the patent and technical literature, therefore a detailed discussion is omitted for the sake of brevity. One example of deep convolutional neural network architecture is the Inception architecture described in the scientific literature. See the following references, the content of which is incorporated by reference herein: C. Szegedy et al., Going Deeper with Convolutions, arXiv: 1409.4842 [cs.CV] (September 2014); C. Szegedy et al., Rethinking the Inception Architecture for Computer Vision, arXiv:1512.00567 [cs.CV] (December 2015); see also U.S. patent application of C. Szegedy et al., "Processing Images Using Deep Neural Networks", Ser. No. 14/839,452 filed Aug. 28, 2015. The manner of training the CNN machine learning model 620 of FIG. 7 is shown in FIG. 8: at step 700 a large number of maternal ultrasound images are acquired, e.g. from publicly available sources or curated specifically for development of the system of this disclosure. The acquired images could be a set (or sets) of images acquired in blind sweeps in all possible orientations or directions, including images with minimal or no clinical utility. At step 702, a human expert (or group of experts) label each image according to its usefulness for clinical diagnosis or measurement. At step 704, a training is performed of the CNN machine learning model 620 using the images labeled at step 702.

The image diagnosis/measurement system 606, which could consists of one or more machine learning models, e.g., deep convolutional neural networks, obtains the selected images 610 from the image selection system 604 and further processes these images. In particular, the image diagnosis/measurement system 606 could include (a) one or more diagnosis classification models for predicting health states, e.g., disease state, pregnancy, fetal viability, etc. (b) segmentation models for identifying and measuring anatomical regions of interest, (c) object detection models for localizing structures of interest, and/or (d) image regression models for measuring clinically relevant numerical quantities. The diagnosis classification and image regression models could be trained using labels provided by human experts, or with labels derived from patient history reports, e.g., in an electronic health record.

An example of a prediction generated by the image diagnosis/measurement system is gestation age. The image diagnosis/measurement system may also generate predictions or classifications related to maternal health, such as classification of fetal anomalies or birth defects, counting the number of fetuses, detection of fetal viability/heartbeat, localization of the placenta, and detection of placental abnormalities. Because of the possibility of different prediction or classification tasks performed by the image diagnosis/measurement system 606 this system 606 may include a multitude of different deep convolutional network models, each of which is trained for a particular classification or prediction task.

Figure 5:
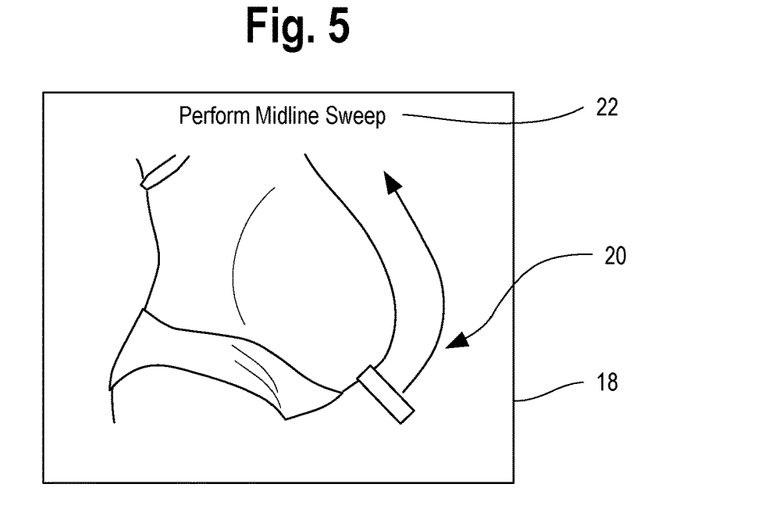
FIG. 5 is an illustration of a feedback display presented to the operator of the probe of FIG. 1 showing one example of a suggestion for obtaining additional ultrasound video sequences to aid in generating clinically useful diagnosis or measurements.

Still referring to FIG. 6, the computer system 600 further optionally includes a feedback generation system 614 to provide feedback to the operator of the ultrasound probe in FIG. 1. The feedback could be displayed to the operator in a variety of formats, for example on the display of a tablet or smart phone, on a local desktop or laptop computer 18 (as shown in FIG. 1), or on a display of an ultrasound machine. The feedback display instructs the operator to perform a different sweep motion in the event that no or too few suitable images were selected in prior sweeps. An example is shown in FIG. 5, in which the feedback display 20 shows an illustration of suggestion to perform a midline sweep; the display could also include suitable text prompts 22 ("perform midline sweep") or even audible prompts or commands, e.g., from speakers incorporated in the computer 18.

In this embodiment, the feedback generation system 614 includes a machine learning model which analyzes the previously selected images 610 to predict the best sweep from a predefined set of blind sweep motions (e.g., lateral motion intersecting the patient's navel, crania-caudal motion intersecting the patient's midline, etc.). The top predicted sweep motion from the set is then suggested to the operator, e.g., via a display, via a spoken prompt, or via a textual prompt or message. The feedback suggestion machine learning model is trained to predict the end-to-end performance of the image selection and diagnosis/measurement models for each of the blind sweep motion types, given the set of images acquired from previously performed sweeps.

Accordingly, in one aspect of this disclosure we have described a method for generating diagnostic information from maternal and prenatal ultrasound images. The method includes the steps of: obtaining a sequence of ultrasound images (FIG. 1) from a human subject; identifying clinically suitable images from the sequence of ultrasound images with the aid of at least one machine learning model (620, FIG. 7) trained to identify clinically suitable images; and further processing the identified clinically suitable images by an image diagnosis/measurement system (FIG. 6, 606). The image diagnosis/measurement system includes at least one of 1) one or more diagnosis classification machine learning models for predicting health states, 2) one or more segmentation machine learning models for identifying and measuring anatomical regions of interest, 3) one or more object detection machine learning models for localizing structures of interest, or 4) one or more image regression machine learning models for measuring clinically relevant numerical quantities. In one possible implementation the sequences of images are obtained by blind sweeps. In one embodiment, the method further includes a step of providing feedback to the operator of an ultrasound probe used to obtain the sequence of images, e.g., as described above and shown in FIG. 6.

In still another aspect, a method of determining one or more maternal health parameters of a female has been described. The method includes the step of performing the method of as described above on a sequence of ultrasound images obtained from the female. The image diagnosis/measurement system produces a prediction of one or more maternal health parameters, and wherein the maternal health parameters are selected from the group consisting of (1) gestation age of a fetus carried by the female, (2) classification of fetal anomalies or birth defects of a fetus carried by the female, (3) counting the number of fetuses carried by the female, (4) detection of fetal viability/heartbeat of a fetus carried by the female, (5) localization of a placenta, and (6) detection of placental abnormalities. In one possible implementation the sequence of images are acquired by blind sweeps. The method may be performed with an optional step of providing feedback to an operator obtaining the sequence of images with an ultrasound probe. For example, the feedback could consist of a display of a suggestion for performing a particular ultrasound sweep or motion, e.g., on a monitor, laptop or desktop computer or other device used by the operator.

Figure 9:
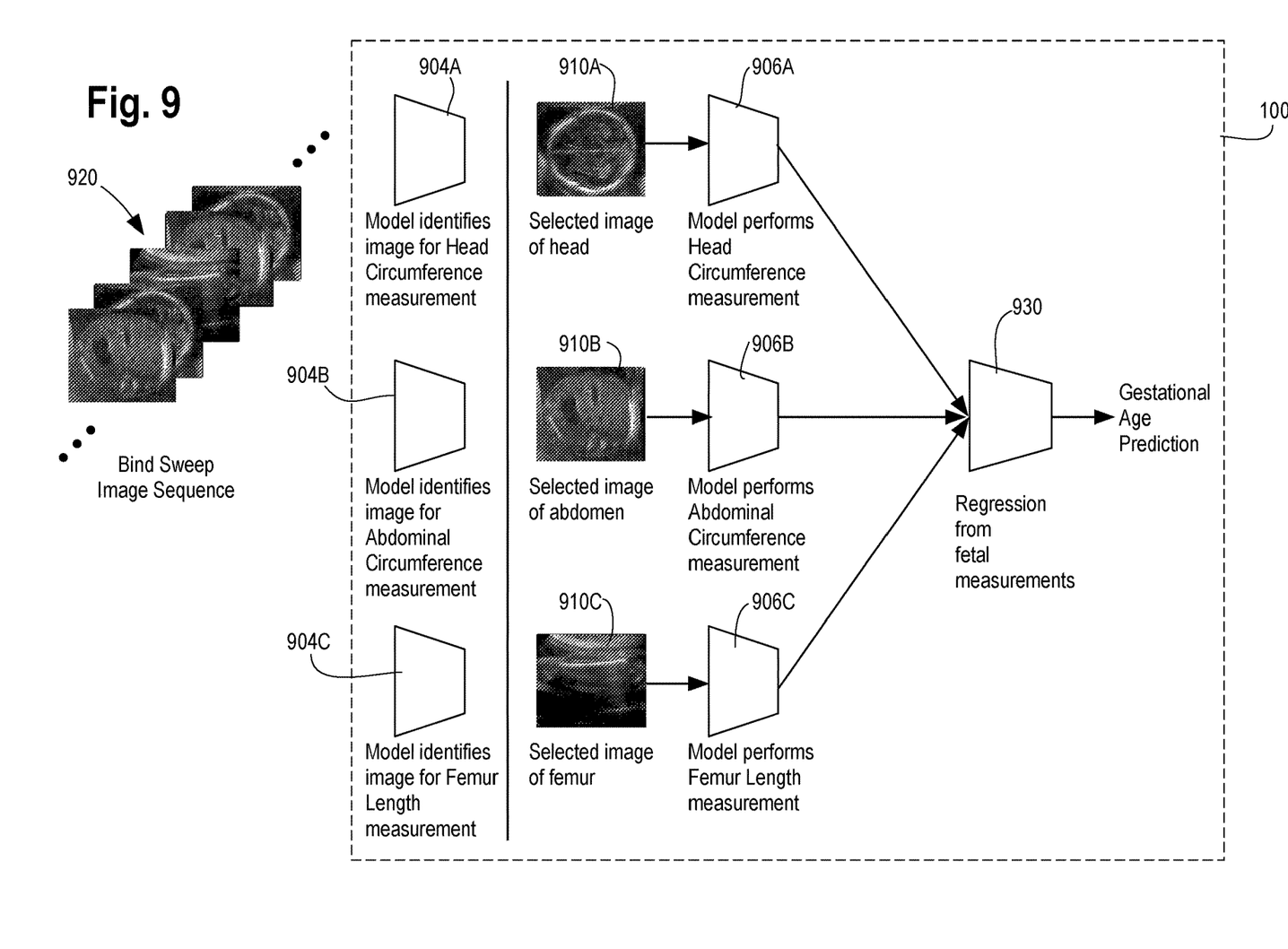
FIG. 9 is a flow chart showing a method of making a diagnosis or prediction using the system of FIG. 6, in this example gestation age prediction from a sequence of ultrasound images. In one possible example, the ultrasound images are acquired in a series of blind sweeps, with or without the use of feedback.

See FIG. 9 for a depiction of one possible system configuration for gestational age prediction. A sequence of ultrasound images 920 is supplied to the computer system 900. The system implements three machine learning image selection models 904A, 904B and 904C. Model 904A identifies and selects images for head circumference measurements; model 904B identifies and selects images for abdominal circumference measurement; model 904C identifies and selects images for femur length measurement. The selected head images 910A are further processed by an image diagnosis/measurement machine learning model 906A which performs head circumference measurements. The selected abdomen images 910B are further processed by an image diagnosis/measurement machine learning model 906B which performs abdominal circumference measurements. The selected femur images 910C are further processed by an image diagnosis/measurement machine learning model 906C which performs femur length measurements. The measurements generated from models 906A, 906B and 906C are supplied to a model 930 which generates a gestation age prediction based on standard formulas used in current medical practice, or optionally machine-learned regression models trained to predict gestational age values from patient history reports and values of head, abdomen and femur measurements contained in such reports.

In another embodiment, the image diagnosis/measurement system 606 (FIG. 6) includes a model which predicts gestational age directly and bypasses intermediate physical size measurements. In particular, training labels (gestational age) are obtained from patient history records and associated ultrasound images and the system 606 generates a classification label or prediction based on comparison of the selected images (610) with the training images directly and without resort to the measurement calculations shown in FIG. 9.

We claim:

1. A computing system configured to receive images from an ultrasound probe that is configured to perform ultrasound and to acquire a video sequence of ultrasound images from a human subject, wherein the computing system implements a 3-D machine learning system that receives the video sequence as a 3-D tensor in which successive 2-D images of the video sequence are stacked along a third time dimension of the 3-D tensor, the 3-D machine learning system comprising (1) a modelling component that comprises a 3-D convolutional neural network that receives as an input the 3-D tensor and that outputs at least one of a 3-D feature representation or a segmentation mask for the complete video sequence, and (2) a final prediction unit comprising one or more neural network layers that compute, based on the at least one of the 3-D feature representation or the segmentation mask, a video-level prediction of diagnostic information about the human subject.

2. The system of claim 1, further comprising a feedback generation system to provide feedback to an operator of the ultrasound probe.

3. The system of claim 2, wherein the feedback generation system generates instructions for the operator to perform a different sweep motion than that occurring during generation of the video sequence.

4. The system of claim 2, wherein the feedback generation system includes a machine learning model trained to predict the best sweep motion from a predefined set of blind sweep motions.

5. The system of claim 3, wherein the instructions are presented as a graphical display, a spoken prompt, or via a text instruction.

6. The system of claim 1, wherein the 3-D modeling component comprises a 3-D spatial transformer layer between the output of the convolutional layers and the final prediction unit.

7. The system of claim 6, wherein the 3-D spatial transformer layer receives probe position estimates generated by a position sensor incorporated in the ultrasound probe.

8. The system of claim 6, wherein the 3-D spatial transformer layer generates an accurate three spatial dimension representation of maternal and fetal anatomy by taking into account the geometric relationships between image frames in the input volume.

9. The system of claim 1 wherein layers of the convolutional neural network of the 3-D modeling system receive 3-D channels consisting of stacked 2-D optical flow estimates between successive 2-D images of the video sequence.

10. A method comprising:
obtaining a video sequence of ultrasound images from a human subject; and
supplying the video sequence to a computer system implementing at least one of:
a) a temporal accumulation machine learning system comprising (1) a two-dimensional image convolutional neural network which generates a segmentation mask of a respective area of interest for each ultrasound image in the video sequence, and (2) a temporal accumulation component that aggregates the segmentation mask of the respective area of interest of each image in the video sequence of ultrasound images over time to generate a video-level prediction of diagnostic information about the human subject;
or
b) a 3-D machine learning system that receives the video sequence as a 3-D tensor in which successive 2-D images of the video sequence are stacked along a third time dimension of the 3-D tensor, the 3-D machine learning system comprising (1) a modelling component that comprises a 3-D convolutional neural network that receives as an input the 3-D tensor and that outputs at least one of a 3-D feature representation or a segmentation mask for the complete video sequence, and (2) a final prediction unit comprising one or more neural network layers that compute, based on the at least one of the 3-D feature representation of the segmentation mask, a video-level prediction of diagnostic information about the human subject.

11. The method of claim 10, wherein the video sequence is obtained by a blind sweep.

12. The method of claim 10, further comprising the step of providing feedback to the operator of an ultrasound probe used to obtain the video sequence.

13. The method of claim 10, wherein the video sequence of ultrasound images is obtained from a pregnant human, and wherein the method further comprises, based on the generated video-level prediction, determining the gestational age of a fetus carried by the pregnant human.

14. The method of claim 10, wherein the video sequence of ultrasound images is obtained from a female human, and wherein the generated video-level prediction comprises a prediction of one or more maternal health parameters selected from a group consisting of classification of fetal anomalies or birth defects of a fetus carried by the female, counting the number of fetuses carried by the female, detection of fetal viability/heartbeat of a fetus carried by the female, localization of a placenta, and detection of placental abnormalities.

15. The system of claim 1, wherein the temporal accumulation component machine learning system a) includes additional sensor inputs from a position sensor incorporated into the ultrasound probe.

16. A computing system configured to receive images from an ultrasound probe that is configured to perform ultrasound and to acquire a video sequence of ultrasound images from a human subject, wherein the computing system implements a temporal accumulation machine learning system that comprises (1) a two-dimensional image convolutional neural network that generates a segmentation mask of a respective area of interest for each ultrasound image in the video sequence, and (2) a temporal accumulation component that aggregates the segmentation mask of the respective area of interest of each image in the video sequence of ultrasound images over time to generate a video-level prediction of diagnostic information about the human subject.

17. The system of claim 16, wherein the temporal accumulation component comprises a trained recurrent neural network model that includes both convolution and temporal memory neural units.

18. The system of claim 16, wherein the temporal accumulation component comprises fixed aggregation rules such as summation of segmentation mask input values to estimate the size of a segmented region of interest as captured from different probe positions over time.

19. The system of claim 16, wherein the temporal accumulation component receives probe position estimates generated by a position sensor incorporated in the ultrasound probe.

20. The system of claim 16, further comprising a feedback generation system to provide feedback to the operator of the ultrasound probe.

* * * * *